Patented Dec. 3, 1940

2,223,421

UNITED STATES PATENT OFFICE 2,223,421

PROCESS FOR PURIFYING PENTAERYTHRITOL

Max Heinrich Hubacher, Valley Stream, and Arthur M. Matheson, Niagara Falls, N. Y., assignors to Niacet Chemicals Corporation, a corporation of New York No Drawing. Application April 14, 1938,
Serial No. 201,930

19 Claims. (Cl. 260—637)

The present invention relates to the production of organic compounds of high purity, and more especially it concerns a novel process for the recovery of pentaerythritol in pure form from reaction mixtures produced by processes involving the condensation of acetaldehyde and formaldehyde in the presence of an alkaline catalyst.

Processes in present-day use for the commercial synthesis of pentaerythritol comprise the condensation of aqueous formaldehyde with acetaldehyde in the presence of a condensing agent such as lime, barium hydroxide, magnesium hydroxide, the alkali metal hydroxides, and other alkaline compounds, preference being given to lime. The principal reaction is indicated by the equation:

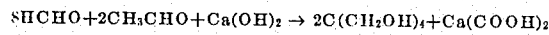

$8HCHO + 2CH_3CHO + Ca(OH)_2 \rightarrow 2C(CH_2OH)_4 + Ca(COOH)_2$

However, simultaneously with this main reaction side reactions occur; and the final reaction mixture contains a variety of products, including pentaerythritol, dipentaerythritol, water-soluble syrupy condensation products and calcium formate, together with small amounts of unreacted formaldehyde, acetaldehyde and $Ca(OH)_2$.

The methods heretofore used for the separation of the pentaerythritol involve adding sulphuric acid to the reaction mixture, thereby precipitating the bulk of the calcium as calcium sulphate. After filtration of the mixture, the calcium sulphate remaining in solution in the filtrate is precipitated with oxalic acid and barium hydroxide as calcium oxalate and barium sulphate. After filtration, the aqueous solution is evaporated to dryness in vacuo. The remaining syrup is extracted with alcohol to dissolve out most of the resinous syrupy material. After filtration and drying, the pentaerythritol obtained is by no means pure, and has a melting point far below that of pure pentaerythritol. This crude product must be purified, preferably by crystallization from water.

In prior processes for pentaerythritol production wherein alkali metal hydroxides were used as condensing agents, the reaction liquors containing pentaerythritol were evaporated to dryness in vacuo and a mixture of pentaerythritol and dipentaerythritol was extracted therefrom. The pentaerythritol was isolated from this extract by a series of fractional crystallizations.

These old processes are subject to many disadvantages. Many filtrations are necessitated, several of which,—such as that by which the calcium oxalate-barium sulphate precipitate is removed,—are tedious and difficult to carry out, unless the entire mixture is heated. Moreover, relatively large volumes of water must be evaporated; and it seemingly is necessary to carry out this concentration step in vacuo, since much lower yields are secured if it is done under atmospheric pressure. The mother liquor, after evaporation of most of the water, is a heavy syrup difficult to filter, and requires dilution with alcohol before filtration. Relatively expensive precipitating agents are necessitated. Impurities such as dipentaerythritol and resinous materials adhere tenaciously to the crude pentaeryritol; and their removal usually requires several crystallizations from water.

Among the more important objects of the invention are the following: to provide in novel manner for producing pentaerythritol of high purity; and to provide for isolating pentaerythritol from reaction mixtures in the form of a compound thereof which may be readily separated from other components of the reaction mixtures and purified,—and from which compound the pentaerythritol may be readily regenerated in simple manner.

The present invention is based in important part upon applicants' discovery that certain organic compounds, capable of forming acetals which are readily susceptible of purification, may under suitable conditions be purified by first forming an acetal, purifying the latter, and subsequently regenerating the original compound by splitting the acetal and removing the aldehyde or ketone used in making the acetal. Separation of the acetal from the reaction mixture and its purification may be effected by filtration, washing, extraction, sublimation, distillation, or crystallization, or by combinations of these steps. For splitting the acetal, the reaction mixture is heated in the presence of a dilute acid. For regenerating the original compound, distillation, with or without steam; or extraction of the aldehyde or ketone from the reaction mixture with ether or other inert, water-insoluble solvent for the same, is preferred.

The invention has especial utility in connection with the production and purification of pentaerythritol. The latter may be formed by any of the well-known processes involving the condensation of formaldehyde and acetaldehyde in the presence of water and an alkaline compound, such as an alkaline earth hydroxide or alkali metal hydroxide. Examples of such methods are described in U. S. Patent No. 1,716,110 to C. E. Burke, and in U. S. Patent No. 2,004,010 to Erich Naujoks.

According to the invention, an aqueous reaction mixture thus produced,—which contains, in addition to pentaerythritol, such impurities as dipentaerythritol, water-soluble syrupy condensation products, calcium formate, and unreacted starting materials,—is treated, in the presence of a mineral acid or other acid, with an aldehyde or ketone capable of forming with the pentaerythritol an acetal.

This acetal-forming reaction may be conducted over a wide temperature range, from below room temperature to the refluxing temperature of the mixture, depending upon the aldehyde or ketone used to form the acetal. In instances where the acetal-forming aldehyde or ketone is not readily soluble in the pentaerythritol reaction mixture, it sometimes is desirable to employ a mutual solvent, such as methanol, ethanol, and the like, to facilitate its solution. However, the use of such solvent is not essential, since the acetal-forming aldehyde or ketone can be suitably dispersed by agitating the aqueous solution, or by use of colloid mills and the like.

In most instances the acetal produced is water-insoluble, precipitates, and is filtered and washed with water to remove mother liquor. In other instances the acetal is water-soluble, in which case the acetal may be extracted from the reaction mixture with a suitable solvent such as benzene, chloroform, carbon tetrachloride, or ether; followed by neutralization of the resultant solution with an alkali metal hydroxide, carbonate, or their equivalent; filtration; distillation of the filtrate; and recovery of the acetal from the resultant condensate.

The acetal is then mixed with a dilute aqueous solution of a mineral acid such as sulphuric acid, and preferably is heated to boiling. The acetal thereby is decomposed, and the free aldehyde or ketone is distilled off and recovered for reuse. The still residue is an aqueous solution of pentaerythritol which upon cooling, with or without further concentration, yields crystals of pure pentaerythritol. The mother liquor may be further concentrated to secure additional crops of pentaerythritol, or it may be used directly for splitting another batch of the acetal.

The acetal-forming aldehydes and ketones employed preferably should not readily react with water to form hydrates; and preferably those are employed which do not readily form polymerization products in the presence of mineral acids from which the starting aldehyde or ketone cannot be regenerated.

The acetal-forming reaction is exemplified by the following equation in which R designates either hydrogen or a simple or substituted alkyl, aryl or aralkyl group, either saturated or unsaturated:

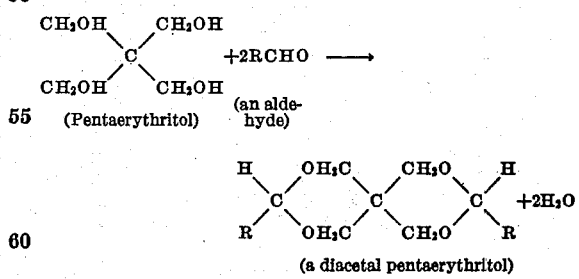

When substituting a ketone, R—CO—R', for the aldehyde in the above equation, a diketonyl pentaerythritol type of acetal,

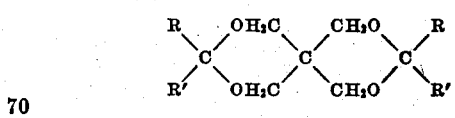

is produced, in which R may be either an alkyl, an aralkyl, or an aryl group, and R' is an alkyl group.

The following examples are presented solely to illustrate the invention:

Example 1

A solution composed of 2590 cc. aqueous formaldehyde solution (37 grams HCHO in 100 grams of solution) (32 mols), 352 grams acetaldehyde (8 mols), and 1500 cc. of water was slowly added over 2 hours to 259 grams of calcium oxide (81.9% CaO) in 3 liters of water. The mixture was agitated and maintained between 20° and 30° C. during this addition, and for a further period of 10 hours. After cooling the solution to room temperature, 1300 cc. of concentrated hydrochloric acid, 5000 cc. of methanol, and 1050 grams of benzaldehyde were added, and the solution agitated. A white crystalline precipitate of dibenzylidene pentaerythritol quickly formed. After standing 12 hours this precipitate was filtered off and washed with water to remove impurities occluded therein. The filter cake was then mixed with 4.5 liters of a 1% aqueous solution of sulphuric acid and was heated to boiling. The dibenzylidene pentaerythritol was split, and the benzaldehyde released was distilled off with water vapor. When the splitting was completed, as indicated by the fact that no more benzaldehyde distilled over, an aqueous solution of pentaerythritol remained as a still residue. Upon cooling this solution, a first crop of crystals of pentaerythritol was obtained. Upon further concentrating the remaining acidic solution another batch of pentaerythritol was secured. This residual solution was filtered and the filtrate used for splitting another batch of dibenzylidene pentaerythritol. The benzaldehyde recovered from the distillation step was reused in the process for producing another batch of the acetal.

Benzaldehyde does not form water-insoluble compounds with dipentaerythritol or with any by-products of the crude pentaerythritol reaction mixture. Therefore, upon adding benzaldehyde and acid to the said reaction mixture, the water-insoluble acetal precipitates, while other components, such as dipentaerythritol, calcium formate, and syrupy condensation products remain in solution and are readily isolated from the acetal.

Other acids may be substituted for the sulphuric acid for splitting the dibenzylidene pentaerythritol, among which may be mentioned hydrochloric, phosphoric, and acetic acids. Instead of using a 1% sulphuric acid solution for splitting the dibenzylidene pentaerythritol, a wide range of concentrations of this or other acid may be used. Concentrations ranging from traces to 10% of mineral acids, and from 10% to 40% of organic acids, are particularly advantageous. The precipitate from the acetal-forming reaction may retain sufficient of the acid used in that step of the process to render unnecessary further addition of acid in the splitting step, so that the splitting of the acetal is effected merely by boiling in water the wet washed acetal,—in this example, dibenzylidene pentaerythritol.

The filtrate secured upon filtration of the diacetal from the acetal reaction mixture contained methanol, and was distilled in the alcohol recovery still for recovery of the latter.

Example 2

To 500 cc. of a crude pentaerythritol reaction liquor,—such as made by condensing 8 mols of formaldehyde with 2 mols of acetaldehyde in the presence of 1 mol of Ca(OH)$_2$ and 4400 parts of water at a temperature of 18° to 30° C.—there were added 60 cc. of concentrated hydrochloric acid, and the mixture was heated to around 40° C.

Thereafter 47.1 grams of benzaldehyde were slowly added to the mixture with vigorous agitation, which then was continued for 10 hours. The precipitated diacetal was thoroughly washed with water and dried. A yield of 78.6% of dibenzylidene pentaerythritol was secured. 63 grams of the latter were mixed with 250 cc. of water and 5 drops of concentrated hydrochloric acid, and the mixture was heated in a flask connected with a column and condenser. Means were provided for returning to the column the water layer which separated from the distilled benzaldehyde. Distillation was continued until no further benzaldehyde distilled over. The still residue was then filtered, and the filtrate evaporated to dryness. A yield of around 98.7% of pentaerythritol of high purity was secured.

*Example 3*

To 40 volumes of a crude pentaerythritol reaction mixture, produced in the manner described in Example 2, were added 7 volumes of furfuraldehyde and 5 volumes of concentrated hydrochloric acid, and the mixture was allowed to stand overnight at room temperature. The precipitated difurfurylidene pentaerythritol was filtered off, washed with water and dried,—being recovered in a yield of around 64% based upon the formaldehyde used.

A solution of 20 grams of the difurfurylidene pentaerythritol in 500 cc. of water containing 2 cc. of concentrated hydrochloric acid was distilled, thereby splitting this acetal and distilling over water and furfuraldehyde which, upon condensation, stratified and were separately recovered. The residual liquor was filtered, and the filtrate partially evaporated, whereupon pentaerythritol crystallized therefrom in a 96% yield. This product had a slight color which was removable by treatment with decolorizing carbon, or by recrystallization from water, or by washing with methanol. The methanol-washed product melted at 248°–252° C.

*Example 4*

To 15 volumes of a crude pentaerythritol reaction mixture, produced in the general manner recited in Example 2, there were added with agitation 1 volume of p-tolualdehyde, 1.5 volume of concentrated HCl, and 10 volumes of methanol. Upon standing, white, crystalline di-p-methylbenzylidene pentaerythritol precipitated, and was filtered and washed. This product upon recrystallization from methanol melted at 202° C.

To 18 grams of this washed acetal were added 2 cc. of HCl and about 600 cc. of water, and the resultant liquid distilled under atmospheric pressure, thereby splitting the acetal and distilling off free tolualdehyde which was readily recovered in high yield from the stratified condensate. The still residue was concentrated, cooled and filtered, and the pentaerythritol thus recovered in high yield was washed with methanol and dried.

*Example 5*

To a mixture of 300 volumes of the crude pentaerythritol reaction mixture, produced as described in Example 2, and acidified with 15 volumes of concentrated hydrochloric acid, were added 40 volumes of acetaldehyde. After standing overnight, the solution was extracted with benzene. The resultant benzene solution was neutralized with sodium carbonate, filtered, and the filtrate distilled under atmospheric pressure. The bulk of the material distilled over at 299°–230° C., and was a thin colorless oily liquid with a gasoline-like odor. Upon chilling it in a brine bath, a white crystalline diethylidene pentaerythritol product melting at 44° C. crystallized out. It was soluble in a wide variety of solvents such as water, alcohols, benzene, petroleum ether, isopropyl ether, and carbon tetrachloride.

Forty grams of the diethylidene pentaerythritol, 600 cc. of water and 2 cc. of concentrated hydrochloric acid were heated in a flask provided with a distilling column, and the liberated acetaldehyde was distilled off and recovered. Upon concentrating the residual liquor, a 99% yield of pentaerythritol melting at 255°–258° C. was recovered.

*Example 6*

Following the general procedure recited in Example 5, a mixture containing 300 volumes of the crude pentaerythritol reaction mixture, 30 volumes of concentrated hydrochloric acid and 18.5 volumes of butyraldehyde yielded 74% of the acetal, dibutylidene pentaerythritol,—a white crystalline solid which, upon recrystallization from dilute methanol, melted at 61° C.

A solution of 48 grams of the acetal in 500 cc. of water containing 2 cc. of concentrated hydrochloric acid was slowly distilled, using a fractionating column. The distillate separated into a butyraldehyde layer and an aqueous layer, the latter of which contained some butyraldehyde which was extracted therefrom with methylene chloride. A 92% yield of pentaerythritol was recovered from the still residue upon evaporation of the latter.

*Example 7*

To 20 volumes of crude pentaerythritol reaction mixture, produced in the manner described in Example 2, were added 5 volumes of concentrated hydrochloric acid, 2.5 volumes of cinnamaldehyde, and 10 volumes of methanol, at room temperature. After standing overnight, the precipitated acetal, dicinnamylidene pentaerythritol, was filtered off and washed with water. This product was recrystallized from dilute methanol and dried, yielding a cream-colored powder. The use of methanol in the acetal condensation may be obviated by strong agitation of the mixture of reactants. A mixture of 40 grams of the above-mentioned acetal, 2 cc. of concentrated hydrochloric acid and 500 cc. of water was slowly distilled and the acetal split under atmospheric pressure, using a fractionating column. The resultant distillate contained the cinnamaldehyde in a yield of 93% of the theoretical; and the still residue, upon concentration, gave an 87% yield of pentaerythritol of high purity.

In the modifications of the invention utilizing ketones as the acetal-forming agents, the crude pentaerythritol reaction mixtures are evaporated to dryness before forming the acetal, as illustrated in the following example:

*Example 8*

After evaporating to dryness 900 volumes of a crude pentaerythritol reaction mixture, prepared in the general manner described in Example 2,—300 volumes of acetone, 400 volumes of methanol and 5 volumes of concentrated sulphuric acid were mixed with the residue, and the mixture refluxed for 4 hours. After standing overnight it was made slightly alkaline with caustic soda, evaporated to 200 volumes, diluted with water, boiled and filtered. The filtered solution was reconcentrated and then chilled, thereby crystallizing diisopropylidene pentaerythritol. It was filtered, and the filtrate was extracted with benzene. Upon removal of the benzene, the recovered acetal had a melting point of 116°–116.5° C.

The diisopropylidene pentaerythritol may be separated from the reaction mixture and purified in other ways than by crystallization. For example:

(a) The reaction mixture may be partially evaporated to remove most of the acetone and methanol, and then, with or without dilution with water, extracted with benzene. It then may be recrystallized, if desired, from a suitable solvent such as methanol.

(b) The reaction mixture is evaporated just to dryness, and the crude mixture then is distilled at atmospheric pressure. The fraction boiling above 102° C. quickly solidifies to a brown solid on cooling from which the white purified diacetal is secured upon recrystallization from methanol.

(c) The reaction mixture may be evaporated just to dryness, after which the residue is heated on an oil bath in a current of air. Sublimation of the diacetal begins at 170° to 175° C., and is completed at 225° C., a white crystalline diacetal being secured.

(d) After evaporation of most of the acetone and methanol, some water is added and the mixture is heated to insure solution of the pentaerythritol and sodium sulphate. Upon cooling, the diacetal which remains undissolved is filtered off in the form of a white solid having a somewhat higher melting point than that obtained by the extraction procedure.

A solution of 15 grams of the diisopropylidene pentaerythritol in 200 cc. of water containing 0.5 cc of concentrated hydrochloric acid was heated in a flask connected with a distilling column, and the liberated acetone was distilled off and recovered. The residual liquor after acetone removal was filtered, and concentrated, and a yield of 94.3% of pentaerythritol, melting between 252° and 255° C. was recovered therefrom—the yield being based upon the diisopropylidene pentaerythritol used.

*Example 9*

To 25 grams of the crude pentaerythritol reaction mixture, prepared in the general manner described in Examp'e 2, were mixed 40 cc. of acetaldol, 10 cc. of water, and 5 cc. of concentrated hydrochloric acid. After standing overnight the solution was diluted with water, extracted with benzene, and the benzene solution well washed with water. The washed extract was a brown, extremely viscous oil, which was soluble in methanol and in isopropyl ether, but was insoluble in water. The extract was distilled under atmospheric pressure, and the fraction boiling between 240° and 300° C., and containing di-3-hydroxybutylidene pentaerythritol, was mixed with water containing a little hydrochloric acid, hydrolyzed and distilled. The resultant distillate contained a brownish-yellow oil, while the residual solution yielded a dark-colored solid which was purified by washing with menthanol, recrystallization from water, and rewashing with methanol. The white crystalline pentaerythritol thus produced melted at 248° to 251° C. It is unnecessary to isolate the diacetal from the crude oil prior to the acid hydrolysis step.

In general all aldehydes and aliphatic ketones, cyclic included, condense with pentaerythritol to form the corresponding acetals. However, while with most of the aldehydes, the condensation occurs in aqueous solution,— apparently in the case of the aliphatic ketones, or those having one aromatic radical, acetal formation by condensation with pentaerythritol apparently occurs only under substantially anhydous conditions. Therefore, when using such compounds it is desirable to dehydrate the crude pentaerythritol reaction mixture before conducting the acetal-forming reaction.

The invention is not limited to the use, as acetal-forming aldehydes, of simple aldehydes. On the contrary, satisfactory yields of acetals capable of splitting in accordance with the invention with the production of pentaerythritol of high purity may be secured by the use of substituted aldehydes,—as, for example, nitro-substituted aldehydes such as o-nitrobenzaldehyde; chlorine-substituted aldehydes such as o-chlorobenzaldehyde; and alkoxy-substituted aldehydes such as p-methoxybenzaldehyde or anisaldehyde.

The acetal-forming agents suitable for use are those which, under the conditions at which the condensation is conducted, have a reactive CHO (aldehyde) group or a reactive C=O (ketone) group. It is generally preferred to use those aldehydes which do not readily form polymerization products or dehydration products in the presence of mineral acids, and from which the starting aldehyde cannot readily be regenerated.

We claim:

1. Process for purifying crude pentaerythritol, which comprises converting the same to an acetal, purifying the acetal thus produced, splitting the purified acetal, thereby liberating pentaerythritol in highly pure form, and separately recovering the latter.

2. Process for purifying crude pentaerythritol, which comprises reacting the same with an acetal-forming compound selected from the group consisting of aldehydes and those ketones having at least one aliphatic radical directly connected with the carbon atom of the carbonyl group, thereby forming a pentaerythritol diacetal, separating the latter from the reaction mixture, purifying the said diacetal, splitting the purified diacetal, thereby liberating pentaerythritol and releasing the free acetal-forming compound, and separately recovering the purified pentaerythritol.

3. Process as defined in claim 2, wherein the said acetal-forming compound is benzaldehyde.

4. Process as defined in claim 2, wherein the said acetal-forming compound is acetaldehyde.

5. Process for purifying crude pentaerythritol, which comprises reacting a solution of the same with an aldehyde forming with pentaerythritol a water-insoluble pentaerythritol diacetal, in the presence of a dilute acid, separately recovering and purifying the diacetal thus precipitated, heating the diacetal in the presence of a dilute aqueous solution of a mineral acid, thereby splitting the diacetal and releasing pentaerythritol and the said aldehyde, removing the aldehyde from the residual aqueous solution, and separately recovering from the latter purified pentaerythritol.

6. Process for purifying crude pentaerythritol, which comprises reacting the same with an aldehyde in the presence of a dilute aqueous solution of an acid, separating from the resultant reaction mixture the pentaerythritol acetal thus produced, removing impurities from the said acetal, heating the purified acetal in the presence of a dilute aqueous solution of a mineral acid, thereby splitting the acetal and forming pentaerythritol and the said aldehyde, removing the latter from the pentaerythritol, and separately recovering the latter.

7. Process as defined in claim 6, wherein an aralkyl aldehyde is employed as the acetal-forming agent.

8. Process as defined in claim 6, wherein furfuraldehyde is employed as the acetal-forming agent.

9. Process for purifying crude pentaerythritol, which comprises reacting an aqueous solution of the same with benzaldehyde in the presence of a dilute acid, separating from the resultant reaction mixture the dibenzylidene pentaerythritol thus produced, washing the latter with an aqueous solution to remove impurities therefrom, splitting the purified dibenzylidene pentaerythritol in the presence of a dilute aqueous solution of an acid, thereby liberating pentaerythritol and benzaldehyde, distilling the latter with water-vapor from the reaction mixture thus produced, and separately recovering from the residual aqueous solution the purified pentaerythritol present therein.

10. Process as defined in claim 9, together with the step of condensing the distilled benzaldehyde and water-vapor, separating the condensed benzaldehyde from the water, and reacting the former with a further quantity of crude pentaerythritol.

11. Process as defined in claim 9, wherein the step of producing dibenzylidene pentaerythritol is conducted in the presence of a volatile mutual solvent for the benzaldehyde, pentaerythritol and water.

12. Process for the recovery of pentaerythritol in purified form from a reaction mixture resulting from the condensation of acetaldehyde and formaldehyde in the presence of water and an alkaline catalyst, which comprises converting the crude pentaerythritol contained in such reaction mixture to a pentaerythritol diacetal which is readily separable from the other components of the reaction mixtures, isolating the said diacetal, thereafter splitting the latter and liberating pentaerythritol of high purity, and isolating and recovering the latter.

13. Process for the recovery of pentaerythritol in purified form from a reaction mixture resulting from the condensation of acetaldehyde and formaldehyde in the presence of water and an alkaline catalyst, which comprises treating such reaction mixture with an acetal forming agent in the presence of a dilute aqueous solution of an acid, separating and purifying the diacetal thus produced, heating the purified diacetal in the presence of a dilute aqueous solution of an acid, thereby splitting the diacetal and liberating the acetal-forming agent and pentaerythritol, removing the former from the resultant reaction mixture, and recovering from the residual liquid the purified pentaerythritol present therein.

14. Process for the recovery of pentaerythritol in purified form from a reaction mixture resulting from the condensation of acetaldehyde and formaldehyde in the presence of water and an alkaline catalyst, which comprises treating the resultant reaction mixture containing pentaerythritol with benzaldehyde in the presence of a dilute solution of a mineral acid and of a water-soluble organic mutual solvent for the benzaldehyde, pentaerythritol and water, thereby producing dibenzylidene pentaerythritol, isolating the latter, heating the same in the presence of a dilute aqueous solution of an acid, thereby splitting the same and liberating benzaldehyde and pentaerythritol, distilling off and recovering benzaldehyde and recovering from the residual aqueous solution the purified pentaerythritol present therein.

15. Process for the recovery of pentaerythritol in purified form from a reaction mixture resulting from the condensation of acetaldehyde and formaldehyde in the presence of water and an alkaline catalyst selected from the group consisting of the alkali metal hydroxides and the alkaline earth metal hydroxides, which comprises treating such reaction mixture with an aldehyde in the presence of a dilute aqueous solution of an acid, thereby converting pentaerythritol present in the said reaction mixture into a pentaerythritol diacetal, isolating the latter and extracting impurities therefrom, heating the said diacetal in the presence of a dilute solution of a mineral acid, thereby splitting the diacetal and liberating pentaerythritol, and recovering the latter.

16. Process as defined in claim 15, wherein the treatment of the said reaction mixture with said aldehyde is conducted in the presence of a volatile organic mutual solvent for the said aldehyde, pentaerythritol and water.

17. Process as defined in claim 15, wherein the pentaerythritol diacetal produced by the aldehyde treatment is water-insoluble and after isolation from the reaction mixture formed in that treatment is washed with an aqueous solution to remove water-soluble impurities prior to the diacetal-splitting step.

18. Process as defined in claim 15, wherein the reaction mixture from the said aldehyde treatment is extracted with a solvent for the pentaerythritol diacetal, the resultant solution is neutralized and filtered, and the said diacetal is isolated from the resultant solution and is split, thereby liberating pentaerythritol, and recovering the latter.

19. Process for the recovery of pentaerythritol in purified form from an aqueous liquid reaction mixture resulting from the condensation of acetaldehyde and formaldehyde in the presence of water and an alkaline catalyst selected from the group consisting of the alkali metal hydroxides and the alkaline earth metal hydroxides, which process comprises treating such liquid reaction mixture in the presence of an acidic compound with furfuraldehyde, thereby producing furfurylidene pentaerythritol, separating the latter from the other constituents of the resultant reaction mixture, splitting the thus isolated furfurylidene pentaerythritol in the presence of a dilute aqueous solution of an acid, thereby liberating pentaerythritol and the said furfuraldehyde, isolating the latter, and recovering from the residual liquid the purified pentaerythritol.

MAX HEINRICH HUBACHER.
ARTHUR M. MATHESON.